United States Patent [19]

Willsey

[11] 4,321,864
[45] Mar. 30, 1982

[54] EGG BREAKING AND CONTENTS SEPARATING MACHINE

[76] Inventor: Charles H. Willsey, Rte. 1, Maple Hill, Kans. 66507

[21] Appl. No.: 114,261

[22] Filed: Jan. 22, 1980

[51] Int. Cl.³ ................................. A23J 1/09; A47J 43/14
[52] U.S. Cl. ......................................... 99/500; 99/577; 99/582
[58] Field of Search .................................... 99/495–500, 99/568, 581, 582, 577, 578; 198/484, 576

[56] References Cited

U.S. PATENT DOCUMENTS

| | | | |
|---|---|---|---|
| 2,961,087 | 11/1960 | Reading | 198/484 |
| 3,305,066 | 2/1967 | Elford et al. | 198/576 |
| 3,455,356 | 7/1969 | Classen | 99/498 |
| 4,137,838 | 2/1979 | Warren | 99/500 |

*Primary Examiner*—Philip R. Coe
*Assistant Examiner*—Timothy F. Simone
*Attorney, Agent, or Firm*—FitzGibbon, Roehrig, Greenawalt & Gilhooly

[57] ABSTRACT

The machine comprises a series of egg cracking and contents separating heads carried on bracket plates which are connected to form a continuously traveling chain conveyor advancing in a horizontal path along which there are means for actuating the cracking and separating mechanisms on each head, with the cracking mechanisms being activated at a transfer station so as to receive a group of eggs from a feed conveyor and while advancing to crack and open the shell portions at a dumping area where each egg contents is dropped into the associated, swingably mounted separating mechanism, comprising a yolk cup and an albumen collecting pan, which is disposed beneath the cracking mechanism and which is advanced to a discharge area where the assembly is tilted so as to discharge the yolk and the albumen into separate receptacles, there being means enabling an operator to inspect and manually discharge a whole egg contents into a collecting receptacle or a spoiled egg into another collecting receptacle when the egg yolk is broken or the operator determines the egg contents is inedible. Means is provided for controlling the transfer of the eggs from the feeding conveyor to the breaking heads and synchronizing the drive of the conveyors which enables high speed operation together with arrangements for obtaining maximum efficiency in the separation of the egg contents from the shell and the albumen from the yolk.

5 Claims, 20 Drawing Figures

FIG_8

Fig-10

EGG BREAKING AND CONTENTS SEPARATING MACHINE

BACKGROUND OF THE INVENTION

This invention relates to egg processing equipment and is concerned especially with improvements in a machine for breaking shell eggs and separating the albumen from the yolks.

Machines have been designed heretofore for processing egss which comprise an endless traveling conveyor on which a plurality of breaking and separating heads are carried in a path in a horizontal plane along which path collecting receptacles are positioned with associated mechanism for actuating the egg supporting, breaking and separating devices on the heads so as to receive eggs at the end of a supply conveyor, crack the eggs, open the cracked shells, dump the contents into a mechanism which separates the albumen from the yolk and deposits the same into collecting receptacles with provision for separately depositing the entire egg contents when there is a broken yolk, or when it is found that the contents is inedible and with provision for discharging the empty shells and washing the cracking and separating mechanism. Machines for this purpose which have been introduced commercially are disclosed in my prior U.S. Pat. No. 2,966,184 granted December, 1960, and U.S. Pat. No. 3,480,056 granted Nov. 25, 1969. Such machines have been accepted in the trade and operated with a high degree of success.

It is a general object of the present invention to provide an improved egg breaking and separating machine of the type described which is adapted to operate more efficiently and at greater speed than machines heretofore provided for this purpose.

It is a more specific object of the invention to provide a machine for breaking shell eggs and processing the contents wherein there is provided an improved egg breaking and separating mechanism which will break the eggs, separate the albumen from the yolks and deposit the same in separate receptacles in a high efficient manner with provision for separate disposal of the whole egg contents when a yolk is broken and when the egg contents is determined by the operator to be inedible.

Another object of the invention is to provide a machine of the type described with improved egg feeding and speed control arrangements which enable operation of the machine at a higher rate of speed than possible with previous machines so as to handle a much larger volume of the product without substantial increase in the size of the machine.

A further object of the invention is to provide a machine of this type having an improved contents separating and product collecting arrangement which facilitates inspection by the operator and enables the operator to more readily control the separating operation and the collection and disposal of the product which is separated and also any product which the operator is able to determine is inedible or otherwise in an undesirable condition.

Another object of the invention is to provide an egg breaking and separating machine wherein a series of traveling breaking and separating mechanisms are fed groups of shell eggs directly from a supply conveyor or accummulator mechanism and means is provided for controlling the feed of the shell eggs so as to transfer the eggs in groups from the feed conveyor to the breaking mechanisms simultaneously regardless of the size and weight thereof and wherein mechanism is provided for coordinating the speed of the feed mechanism and the speed of the breaking mechanisms so as to operate the machine at higher speeds than has been practical heretofore with prior breaking machines.

A further object of the invention is to provide in an egg processing machine of the type described an improved breaking and separating mechanism which is more rugged and more efficient than mechanisms provided for this purpose in previously designed machines.

A still further object of the invention is to provide in an egg processing machine of the type described a more efficient arrangement of the controls for actuating the various mechanisms which improves the operation and enables the user to operate the machine more easily and to better inspect the product so as to maintain the desired quality at the maximum operating speeds.

Another object of the invention is to provide in an egg processing machine of the type described improved arrangements for complying with sanitation requirements when in use and for enabling fast and efficient clean up of the machine after use.

A machine capable of achieving these and other objects and advantages is disclosed and claimed herein which comprises a plurality of egg breaking and contents separating mechanisms in side by side relation and mounted so as to travel continuously in an endless path in a generally horizontal plane, which egg breaking and contents separating mechanisms each comprise cradle forming means for receiving and supporting an egg and associated means for clamping the egg in the cradle, cracking the egg shell and opening the shell so as to dump the egg contents into a separating mechanism which is aligned below the cracking mechanism, means to operate the breaking and separating mechanisms so as to deposit the egg contents in predetermined collection receptacles spaced along the path and to eject the empty shell portions, continuously traveling conveyor means for feeding groups of shell eggs in row relation from the conveyor into the breaking mechanisms, means cooperating with the conveyor for effecting the transfer of the eggs from the conveyor to the breaking mechanisms simultaneously regardless of size and weight of individual eggs and means for synchronizing the speed of the egg feeding and transfer means and the travel of the breaking and separating mechanisms so as to enable operation of the machine at maximum speed.

The invention will be best understood by reference to the following description of a preferred embodiment of an egg processing machine which incorporates therein the principle features of the invention and which is illustrated in the accompanying drawings wherein the same elements are identified in the several views by the same numerals.

DESCRIPTION OF THE PREFERRED EMBODIMENTS OF THE INVENTION

Figure 1:
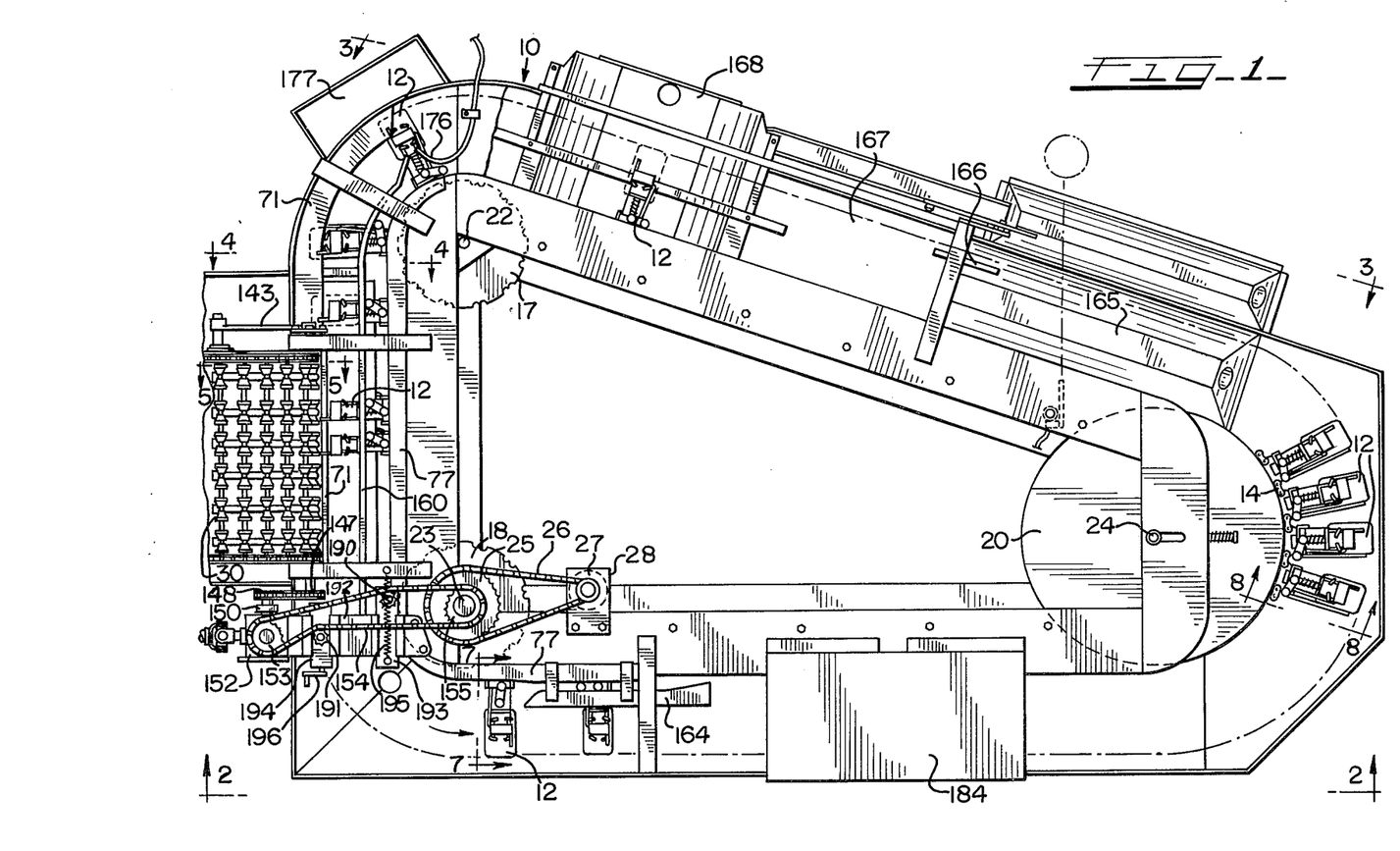
FIG. 1 is a plan view of an egg breaking and separating machine which embodies therein the principle features of the invention, with certain elements omitted and others shown in part.
Figure 2:
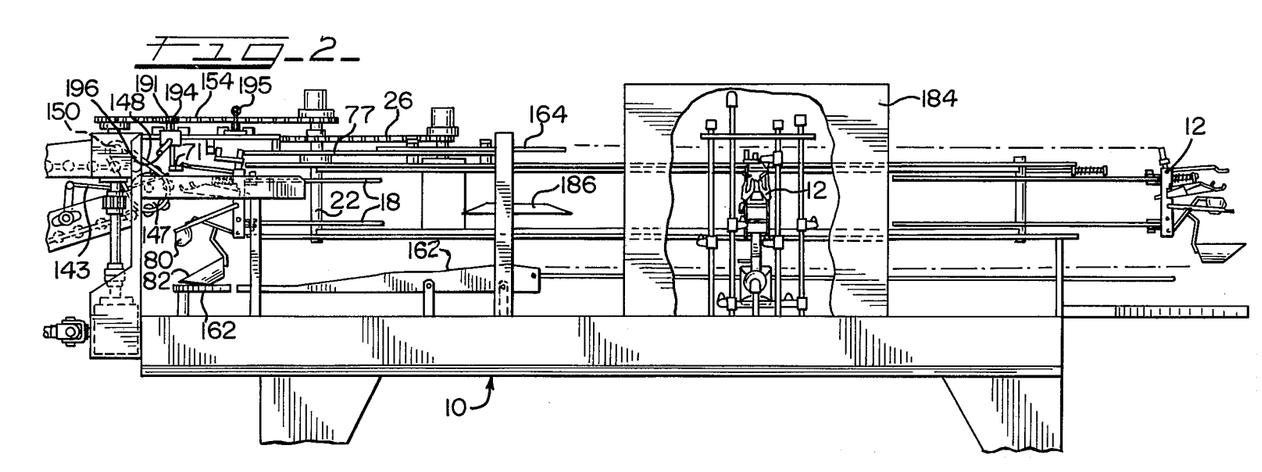
FIG. 2 is a side elevation of the machine taken on the line 2—2 of FIG. 1.
Figure 3:
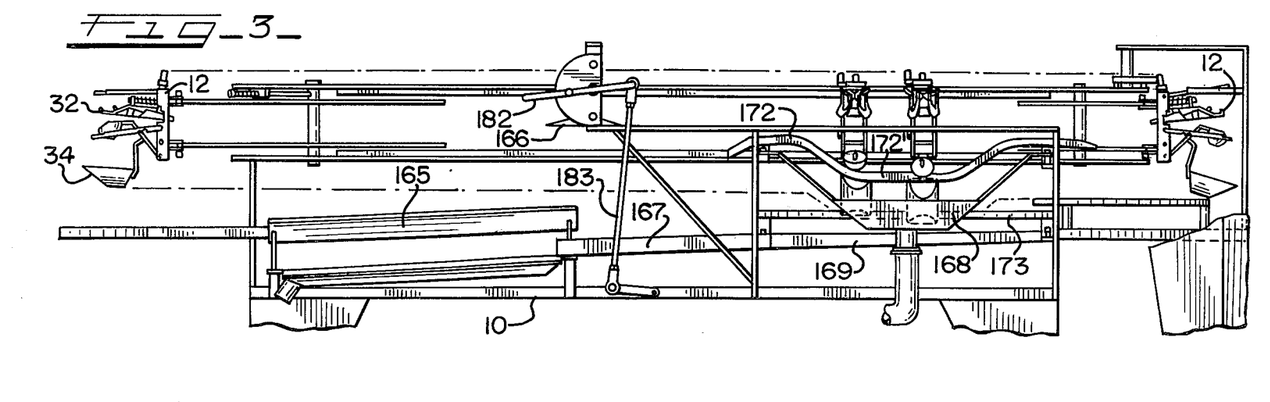
FIG. 3 is a side elevation of the machine taken on the line 3—3 of FIG. 1.
Figure 7:
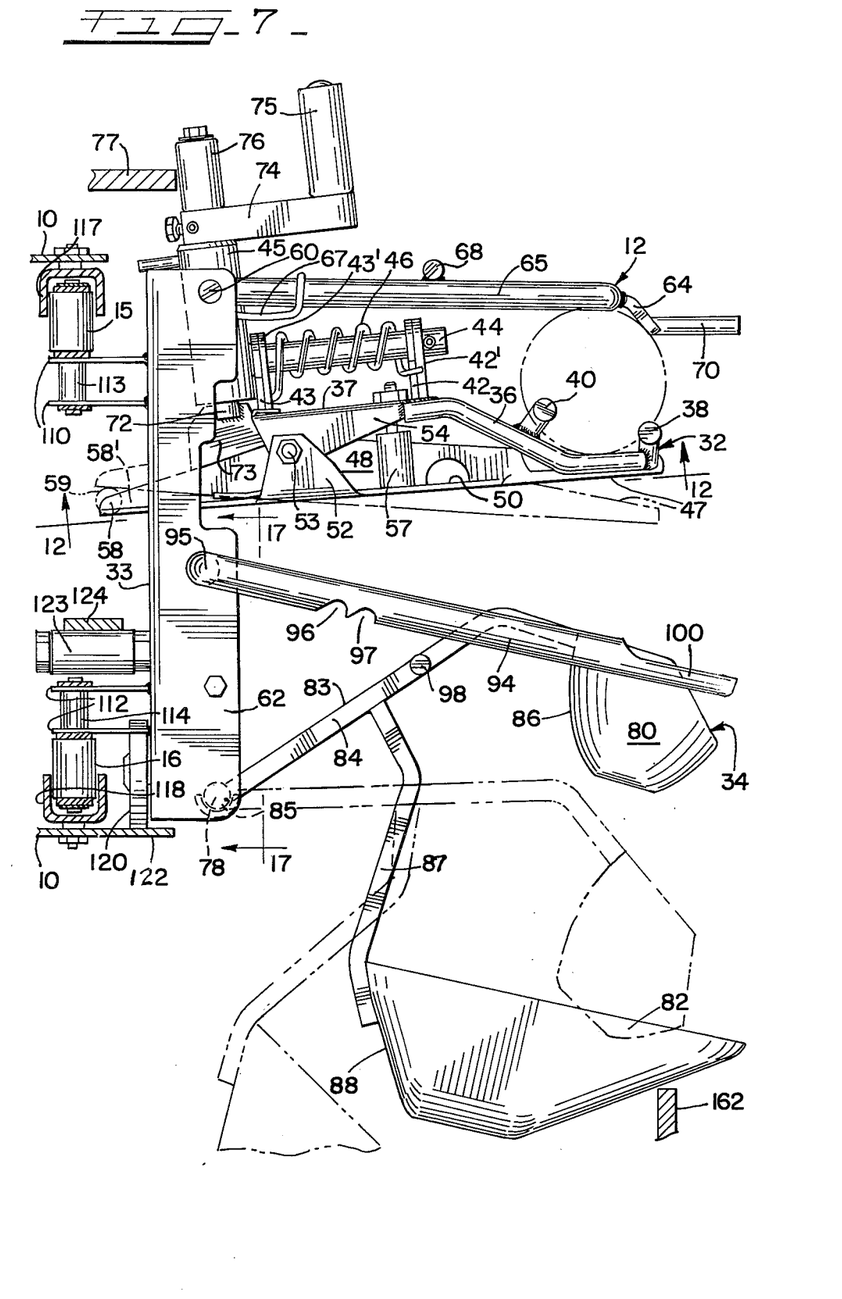
FIG. 7 is a side elevational view with part in section, showing the cracking and separating assembly at the cracking station, the view being taken on the line 7—7 of FIG. 1, to a larger scale.

Referring to FIGS. 1 to 3, the machine, as illustrated, comprises a supporting frame structure 10, which is of generally triangular configuration, and on which there is mounted, for travel in an endless path and in a horizontal plane, a series of egg breaking and contents separating assemblies, or heads 12, which are connected in side by side relation by linkage members so as to form an endless chain assembly 14 with vertically spaced upper and lower linkage arrangements 15 and 16 (FIG. 7). The assembly 14 is carried on three pairs of sprocket arrangements 17, 18 and 20 which are mounted on vertically disposed shafts 22, 23 and 24, respectively, the shafts being arranged in a triangle at the three corners of the triangular frame assembly 10, with each pair of the sprockets being positioned in axially spaced relation on the associated shaft so as to support the assembly 14. The one shaft 23 serves as a drive shaft while the other two are idler shafts and the conveyor support arrangement at 20 may be in the form of circular plates with the peripheral edges arranged to engage the conveyor links. The shaft 23 has a sprocket 25 on the top end thereof which is driven by chain 26 running to the sprocket 27 on the output shaft of a right angle gear box 28 which has an input drive connection with a power drive, preferably, a hydraulic motor, (not shown). The assemblies 12 are each operated to receive the shell eggs, crack the shells, separate the white, or albumen, from the yolk, or otherwise dispose of the egg contents as the assemblies traverse the straight and arcuate paths defined by the spaced sprocket arrangement. The eggs are fed in rows to the assemblies 12 from a conveyor 30 at a transfer station or area. The conveyor 30 may be the egg carrying conveyor at the discharge side of a washing machine (not shown). The cracking and separating assemblies 12 are operated by various cam arrangements which are spaced along the path of the chain assembly 14, with certain operations under operator control, while the egg products are discharged into collecting trays or receptacles, which are positioned at predetermined locations below the path of travel of the assemblies 12, to receive the yolk, the albumen, the whole egg resulting from broken yolks, and any inedible product which the operator detects.

Each of the egg cracking or breaking and separating assemblies 12 (FIGS. 7 to 17) comprises a cracking or breaking mechanism 32, which is mounted for outboard swinging movement on the uppermost end of a vertically disposed supporting bracket plate 33, and an egg contents separating mechanism 34, which is detachably mounted for outboard swinging movement at the bottom end of the bracket 33 and which is disposed in vertically spaced relation beneath the breaking assembly 32.

The breaking mechanism 32 comprises a pair of cradle forming members 35, 35' which are formed of bent rods 36, 36' disposed on the outer ends of bracket plates 37, 37' with spaced pairs of cross pieces 38, 40 and 38', 40' which are curved and spaced axially on the rods 36, 36' so that when the cradle members 35, 35' are positioned side by side, an egg supporting cradle is formed having a concave configuration corresponding approximately to the surface configuration of an average shell egg when placed thereon with the long axis extending in a direction normal to the axes of the rods 36, 36'. The cradle supporting bracket plates 37, 37' have upstanding from their top faces, spaced pairs of relatively short link forming members 42, 43 and 42', 43' which are spaced apart and extend in inclined relation in the direction of the innermost edges of the plates 37, 37'. The link members are pivotally mounted, at their upper ends, in paired relation, 42, 42' and 43, 43', on a common support pin 44. The pin 44 extends outwardly of a vertically disposed short length cylinder 45. A torsion spring 46 is carried on the support pin 44 which is arranged to urge the two cradle forming members 35, 35' toward a side by side or closed position. Each of the cradle forming members 35, 35' has an associated cracking knife blade 47, 47' which extends at the outer end of an upstanding inner side flange 48, 48', on a base plate 50, 50'. Each base plate 50, 50' has a small upstand flange portion 52, 52' on the outer side thereof. A pivot pin 53, 53' extends between each pair of flange portions 48, 52 and 48', 52', and is journaled in spaced side flange portions 54, 55 and 54', 55' which depend from the outer and inner edges of the bracket plates 37, 37' and are straddled by the flange portions 48, 50 and 48', 50' on the knife support plates 50, 50'. The pins 53, 53' have torsion spring 56, 56' (FIG. 11) mounted thereon so as to urge the knife blades to a position along the inner side edge of the associated cradle member 35, 35' where the cutting edge of each blade 47, 47' would penetrate the shell of an egg properly positioned on the cradle members 35, 35'. The cradle supporting bracket plates 37, 37' each have a depending post member 57, 57', adjustably mounted on the bottom surface thereof with the bottom end disposed so as to engage the top surface of the associated blade supporting base plate 50, 50'. Each post member 57, 57' (FIGS. 7, 13) serves as an adjustable limit stop for movement of the associated blade into the proper cracking position. The blade carrying flanges 48, 48' are extended at the inboard ends at 58, 58' so as to project beyond the vertical plane of the support bracket 33 where it maybe engaged on the cam track forming edge of a cam bar 59 (FIG. 7) for swinging the blade to a cocked position and then releasing it so as to crack the shell of an egg on the cradle as hereinafter described. The vertically disposed cylinder 45 is pivotally mounted on the support bracket 33 by means of a pivot pin arrangement 60, 60' extending from opposite side wall portions of 45 in a diametrical plane and journaled in forwardly extending side flange members 62 and 62' on the bracket 33. The pivot pin arrangement 60' at the one side carries a torsion spring 63 which urges the cracking assembly 32 toward an upwardly and outwardly inclined position (FIG. 8). An egg hold down or clamp member in the form of a rectangular plate 64, is mounted on the outer end of a support arm 65, so as to extend in egg clamping relation above the cradle members. The support arm or rod 65 has its inner end secured on a small bearing forming sleeve member 66 on the pivot member 60 and a torsion spring 67 urges the support arm 65 toward a position to bring the clamp member 64 into engagement with the top surface of an egg when properly positioned on the cradle members for the cracking operation. The clamp plate 64 serves to define a hinge point when the shell halves are opened by swinging the cradle members 35, 35' on the pin 44 to open position. The support arm 65 extends along the one side of and somewhat above the cradle supporting pivot pin or shaft 44 and a short rod member 68 extends laterally in the direction of the pivot pin 44 a sufficient distance to engage the outer end portion of the pin 44 and limit the movement of the clamp plate 64 in the direction of the cradle members 35, 35'. The clamp plate 64 carries an outwardly directed pin member 70 adjacent the end opposite the support rod or arm 65 which serves as a cam follower for engaging a cam track formed by a plate and bar member 71 (FIG. 1) when the clamp member 64 is raised to receive an egg at the egg feeding station and to release the shell halves at a shell discharge station which is at the entrance to the egg feeding area. The clamp plate 64 serves to hold the shell egg in position dring the cracking and opening and thereafter to hold the shell halves on the cradle members 35, 35' until the assembly 32 reaches the shell discharge station.

Figures 11, 12:
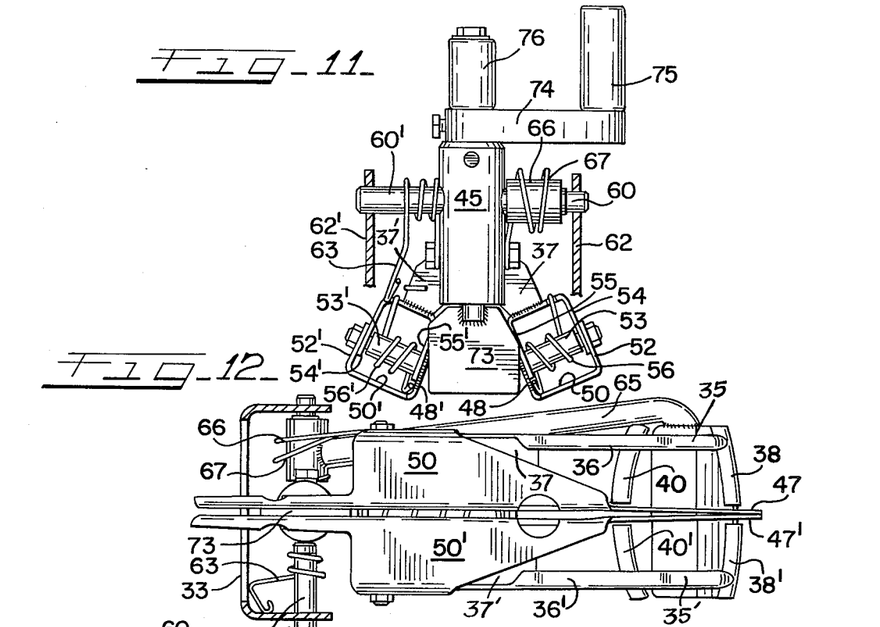
FIG. 11 is an elevational view of the rear of the cracking and separating assembly and associated cam members.
FIG. 12 is a bottom view of the cracking mechanism with the cradle members in fully closed position, the view being taken on the line 12—12 of FIG. 7.
Figure 13:
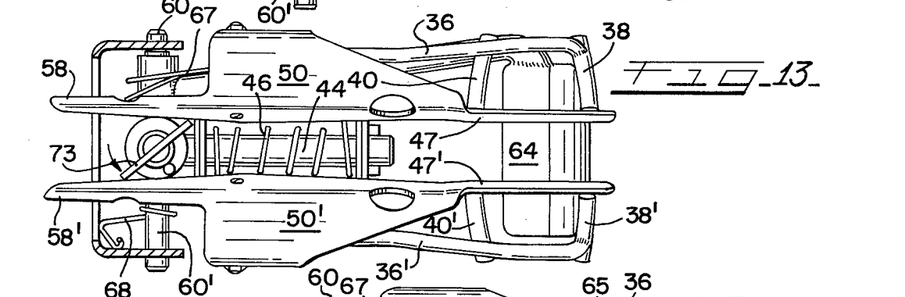
FIG. 13 is a view similar to FIG. 12 with the cradle members in partially open position.
Figure 14:
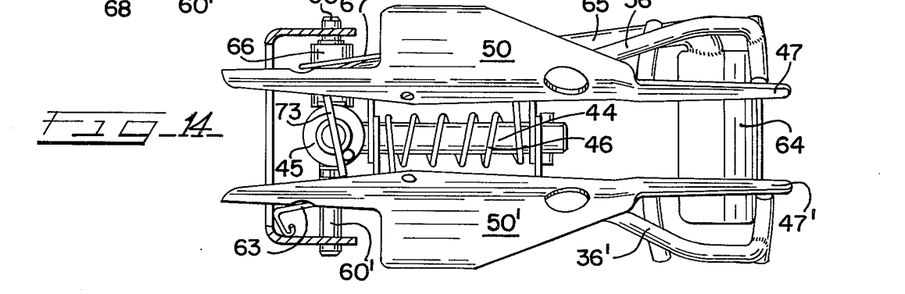
FIG. 14 is a view similar to FIG. 12 with the cradle members in fully open position.
Figure 18:
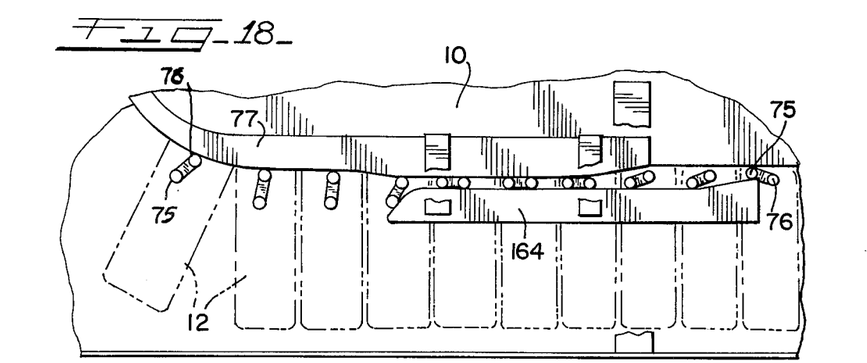
FIG. 18 is a fragmentary plan view showing the cam track arrangement for operating the cracking and separating mechanisms in the cracking, dumping and separating area.
Figure 19:
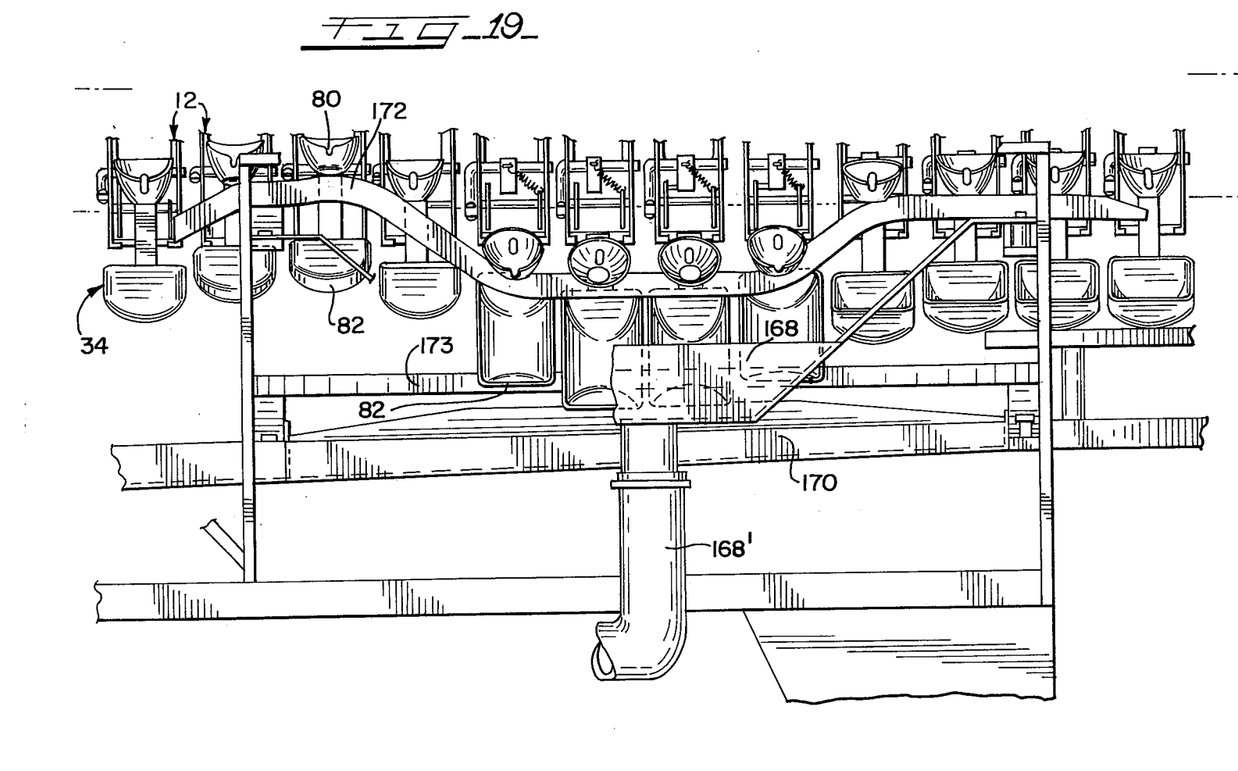
FIG. 19 is an enlarged elevational view showing the area where the yolk and albumen are discharged into collecting pans.

The cradle forming members 35, 35' are movable between a fully closed position (FIG. 12) and a fully open position (FIG. 14). The torsion spring 46 normally urges the cradle members 35, 35' toward the fully closed position, that is, toward each other with the knife blades 47 and 47' in side by side relation between the oppositely disposed inner ends of the cradle cross members 38, 40 and 38', 40'. The cradle members 35, 35' are moved toward the open position by mechanism mounted on the vertically disposed cylinder member 45 which includes a shaft forming pin 72 rotatably mounted in the cylinder member 45 and having secured at its lower end, a small cam forming plate 73 which will rotate or turn with the shaft 72. The axis of the shaft 72 is in a plane which extends between the inside flanges 48, 48', on the knife carrying plates 50, 50' at a point inboard of the pivot pins 53, 53'. The cam plate 73 extends flat-wise between the flanges 48, 48' when the cradle members are in a closed position (FIG. 12). The cam plate 73 has a predetermined width dimension, such that, upon rotation to bring it into a plane normal to the plane of the opposed surfaces of the flange members 48, 48', the side edges of the plate will engage the oppositely disposed flange surfaces and force the cradle members 35, 35' and their associated cracking blades away from each other against the force of the torsion spring 46, with the cradle and associated knife blades swinging about the common supporting pin 44. Upon rotation of the cam plate 73 into a plane normal to the plane of the flange member 48, 48' the cradle and knife assemblies are at a fully open position and locked in such position by engagement of the side edges of the cam plate 73 with the surfaces of the flange members 48, 48' (FIG. 14). At the upper end of the cam plate shaft 72 a small crank arm 74 is secured on the shaft and extends radially of the axis of the shaft 72 with an upstanding cam follower roller 75 mounted on its free end. The upper end of the shaft 72 carries an upstanding cam follower roller 76. The cam roller 76 engages an inboard cam rail assembly 77 which extends along the path of the cracking and separating assemblies 12 from a point at the entrance to the egg feeding area to a point in advance of the cracking and dumping area (FIGS. 1 and 18). The track formation is contoured to control the swinging movement of the cracking mechanism 32 about the pivot pin 60, 60' as hereinafter described. The operating movements of the separating mechanism 34 are controlled by cam rail elements which will be described.

Figure 15:
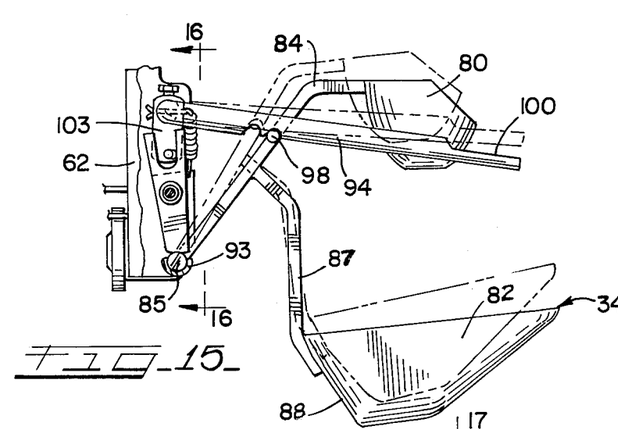
FIG. 15 is a fragmentary elevational view with portions broken away showing the mounting and latching arrangement for the separating mechanism.
Figure 16:
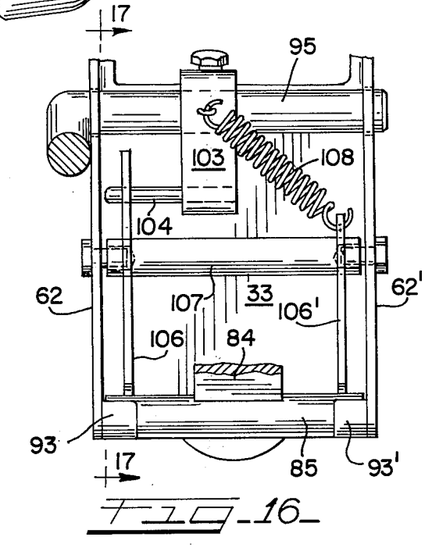
FIG. 16 is a fragmentary front elevational view with parts in section, showing the mounting and latching arrangement for the separating mechanism, the view being taken on the line 16—16 of FIG. 15 to a larger scale.
Figure 17:
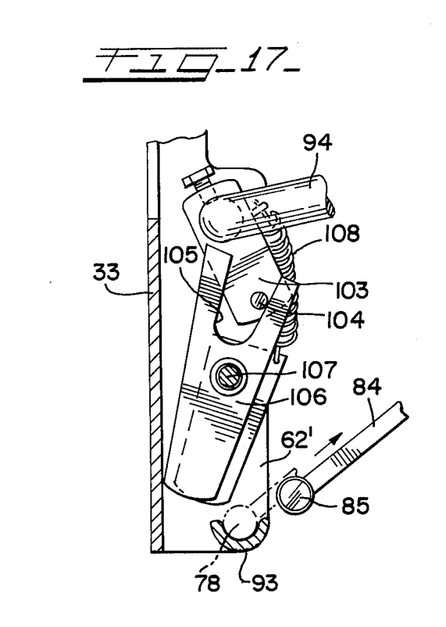
FIG. 17 is a fragmentary sectional view taken on the line 17—17 of FIG. 16 showing the mounting and latching arrangement in a position to release the separating mechanism and showing the mounting pivot released.

The egg contents separating mechanism 34 (FIGS. 7, 8, 10, 15 to 18) which is removably mounted at the lower end of the support plate 33 for outboard swinging movement about a pivot axis 78 comprises a separating cup or yolk bowl member 80 arranged above an albumen receiving pan or tray member 82 with these two members connected by a bracket 83 having the general shape of a Y. In the attached and supported position shown in FIG. 8, the open tops of the two members 80 and 82 are in spaced, generally parallel level planes with the double arm or leg member 84 of the bracket 83 having a cross pin 85 (FIGS. 10, 15, 17) at its inner end for mounting the assembly on the pivot axis 78. The outer end of the bracket member 84 is secured at the top of the inboard portion of the peripheral side wall 86 of the yolk bowl 80. The other leg or arm member 87 of the bracket 83 extends outboard of the member 84 intermediate the ends thereof and is attached at its outboard end to the top edge of the inboard wall 88 of the pan 82. The yolk bowl 80 may be in the form shown in my U.S. Pat. No. 4,111,111 granted Sept. 5, 1978. As illustrated, it has a depth sufficient to receive the whole contents of the largest size egg and a bottom portion in which the yolk will be retained while the side wall 86 has an upwardly opening slot formation 89 of two part configuration (FIG. 10) in the outboard portion thereof which extends above the yolk receiving bottom portion through which a large mass of albumen is adapted to quickly exit and drain into the pan 82 below. A relatively small additional aperture 90 in the inboard side of the wall 86, which extends above the yolk receiving bottom portion, provides additional drainage of the albumen under certain breaking conditions. The albumen receiving pan 82 has the general configuration of the corresponding pan shown in U.S. Pat. No. 4,111,111 with an upwardly and outwardly sloping outboard wall 92 which facilitates discharge of the albumen therefrom when the assembly 34 is tilted to dumping position at the discharge station (FIGS. 1 and 3). The separating mechanism 34 is hingedly mounted in readily removable relation on the support plate 33 by providing at the bottom ends of the side flange members 62, 62' on the plate 33 inwardly extending upwardly opening bearing forming socket members 93, 93' (FIGS. 10, 16, 17) into which opposite end portions of the pivot pin 85 may be seated. The mounting includes a latching arrangement for retaining the pin 85 in the bearing sockets 93, 93' and permitting ready removal when required together with an arrangement for latching the mechanism 34 in certain hinged positions thereof. The latching arrangement comprises an outwardly directed arm member 94 which is attached at its inner end to a pivot pin 95 with the latter extending between and journaled in the side flange members 62, 62' of the support plate 33 at a point above the pivot axis 78. The latch arm 94 has two adjoining slot formations 96, 97 on the bottom side, at a predetermined point intermediate its ends, which are adapted to receive a latch pin 98 extending laterally of the upper portion 84 of the bracket arm 83. The slots 96, 97 and the pin 98 are located relative to each other so that the separating mechanism 34 may be latched when in two different predetermined positions, one being in a substantial level position (FIG. 8) and the other being somewhat higher. The mechanism 34 may, of course, be released so as to swing downwardly to a discharging position, which is indicated in phantom line in FIG. 7, by lifting the latch arm 94 either manually or by engagement of the flattened end portion 100 with a cam member as hereinafter described. When in the latching position, it may be held against disengagement by a cam plate. The pivot pin member 95 carries a short crank arm 103 (FIGS. 15 to 17) intermediate its ends which extends radially and downwardly and carries at its lower end a small diameter cross pin 104. The pin 104 extends into a relatively wide slot 105 in the uppermost end of small elongate plate member 106 which is secured intermediate its ends on one end of a pivot bar 107. The pivot bar 107 extends between the flanges 62, 62' of the support plate 33 and is journaled therein at a point midway between the pivot point 78 and the pivot pin 95. The plate member 106, and a corresponding plate member 106' at the other end of pivot bar 107 both extend a sufficient distance below the pivot bar 107 to overlie the open tops of the bearing sockets 93, 93' and retain the pivot pin 85 in the socket members 93, 93' when it is positioned therein and the latch arm 94 is in either of the two latching positions for the separating mechanism, as indicated in FIG. 15. When the latch arm 94 is raised sufficiently as shown in FIG. 17, the latch plate members 106 and 106' are swung to an inoperative position and the pivot pin 85 is released for removal of the assembly 34. A tension spring 108 is connected at its opposite ends to the crank arm 103 and the forward top corner of the plate member 106' which urges the latch plate members 106 and 106' in the direction to latch the pivot pin 85 and prevent disconnection and removal of the assembly 34 except by lifting the latch arm 94 a sufficient distance as shown in FIG. 17.

The bracket forming support plate 33 has mounted on its inboard face (FIGS. 7 and 8) a short distance from the top and bottom thereof, pairs of spaced parallel chain link forming plates 110 and 112 which extend across the plate 33 and which are connected at opposite ends by link pins 113 and 114 with the latter extending above and below the plates 110 and 112 so as to provide the link assemblies 15 and 16 for connecting to the adjoining assemblies 12 so as to form a continuous endless chain conveyor formation. Top and bottom guide channels 117 and 118 are provided on the frame structure 10 to define the conveyor path. In addition, a small wheel or roller 120 is mounted on the bottom margin of the plate 33 and a bearing plate or bar 122 is provided on the support frame 10 on which it rides. Spaced above the wheel 120 there is mounted a further roller 123 which rides on the bottom surface of a plate or bar 124 secured on the frame 10. The wheel 120 and roller 123 aid in stabilizing the assemblies 12 and holding the same in the proper position, with the plates 33 in a vertical plane as they travel along the path defined by the guide channels 117 and 118 and the cracking and separating mechanisms 32 and 34 are operated to crack the shell of an egg in the cradle 35, 35', open the shell portions so as to dump the contents into the separating mechanism 34, discharge the yolk and albumen into separate receptacles, eject the shell portions and return the mechanisms 32 and 34 to proper position for receiving an egg at the transfer station and repeat the cycle as hereinafter described.

Figure 4:
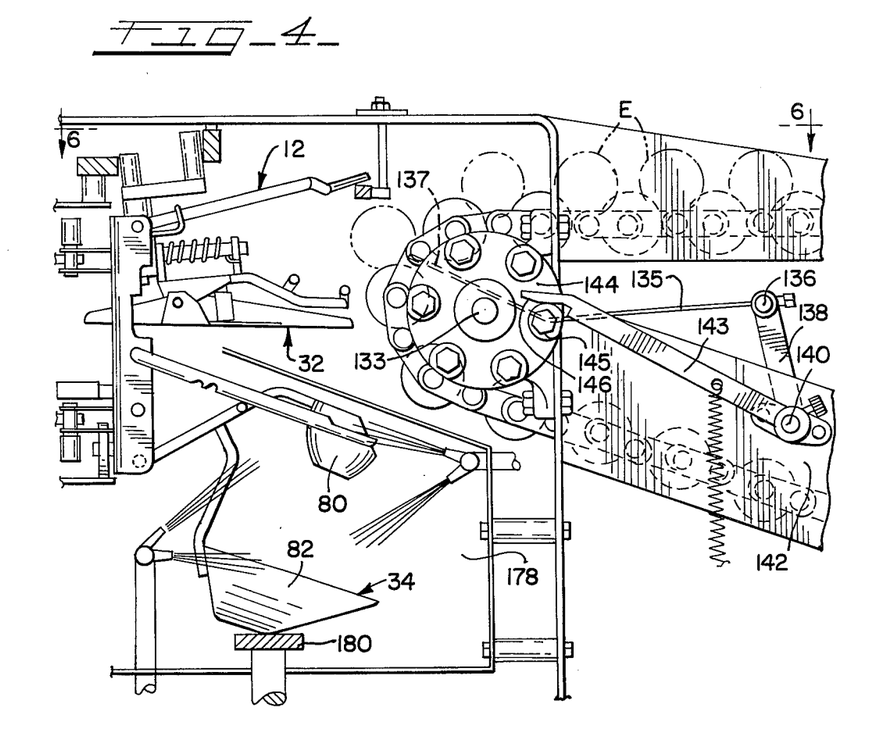
FIG. 4 is an elevational view taken on the line 4—4 of FIG. 1 to a larger scale.
Figure 5:
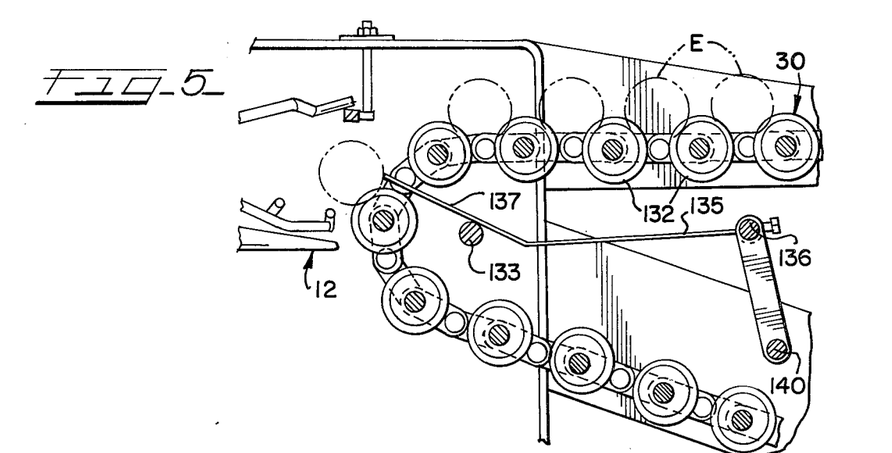
FIG. 5 is a fragmentary cross-sectional view taken on the line 5—5 of FIG. 1 to a larger scale.
Figure 6:
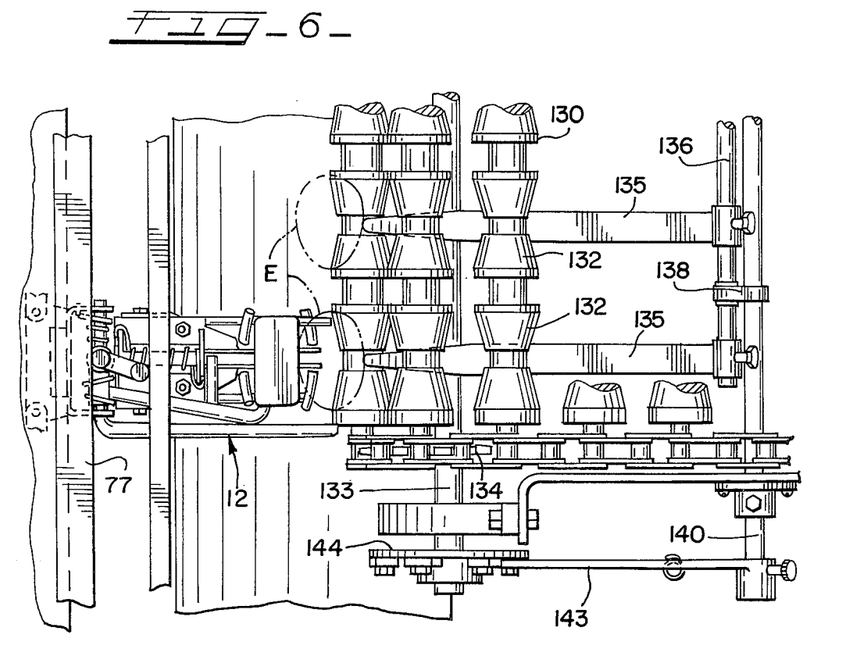
FIG. 6 is a fragmentary plan view taken on line 6—6 of FIG. 4, showing an end portion of the egg feeding conveyor and one of the cracking and separating assemblies in position to receive an egg.

Referring to FIGS. 4 to 6, the conveyor 30 at the infeed or transfer station is a roller pocket type, such as, shown in my U.S. Pat. Nos. 2,966,184, 3,480,056, 2,979,746 granted Apr. 18, 1961 and U.S. Pat. No.3,120,889 granted Feb. 11, 1964. The conveyor 30 comprises spaced pocket forming roller assemblies 130 characterized by a series of spool elements 132 mounted in axial alignment on transverse shafts 133 which extend between spaced side chains. Egg receiving pockets are formed between the aligned spools on adjacent shafts so as to advance the eggs in rows with the eggs in each row having their long axes approximately in transverse alignment. The conveyor 30 is positioned so that the discharge end is at the infeed or transfer station or area for the breaking machine and properly aligned relative to the path of the breaking and separating heads 12 for transfer of successive rows of eggs to the breaking mechanisms 32 in timed relation to the travel of the heads 12 so that the heads are filled as they move past the discharge end of the conveyor 30. As shown in FIGS. 1, 2 and 4, the conveyor 30 is driven by cross shaft 133 through the side chain carrying sprockets 134 and the eggs drop off the conveyor spool elements 132 as each row thereof moves in the circular path defined by the sprockets 134 as illustrated in FIG. 5. Since the eggs will vary in size and weight, normally all the eggs in a row will not move into the cradle formations 35, 35' at the same time. Smaller and lighter eggs will not move out of the pockets as quickly as the larger and heavier eggs and the speed with which they will move from the feed conveyor pockets into the cradles will not be the same. An arrangement is provided to obtain a more nearly uniform transfer of all the eggs in each successive row from the conveyor pockets to the cradles regardless of the size or weight of the eggs. A series of pusher rods or bars 135 of equal length are mounted at the trailing ends thereof on a cross rod 136 and arranged to extend forwardly as shown in FIG. 5, each having a forward end portion 137 which is inclined upwardly and rides on the drive shaft 133. The cross bar 136 is journaled at opposite ends on a pair of crank arms 138, which extend radially upwardly of a rocking shaft 140 to which the crank arms are secured at their lower ends. The shaft 140 is journaled in the side members of the conveyor support frame 142 and extended at one end to receive a rocking bar arm member 143 which extends in the direction of the drive shaft 133. The shaft 133 carries a plate 144 having a series of lug members 145 spaced about the peripheral margin of a face thereof. The arm 143 has its free end 146 positioned to ride on the lugs 145 and to drop from one lug 145 to the next one as the plate 144 rotates so as to provide the shaft 140 with a timed rocking movement which imparts movement to the pushers 135 in a substantially oval path so that the inclined end portions 137 are projected between the successive roller assemblies 130 as they round the end of the conveyor and are withdrawn in timed relation to the movement of the roller assemblies 130. This enables all the eggs in each successive row to be transferred more nearly simultaneously and permits the speed of the conveyors to be adjusted to a higher operating rate.

The conveyor drive shaft 133 carries at its opposite end a sprocket 147 (FIG. 2) which is connected by a drive chain 148 to a sprocket 150 on a power output shaft of a gear box 152. The gear box 152 has a power input gear 153 which is connected by a drive chain 154 with a sprocket 155 on the power shaft 23, so that, the power shaft 23 drives both the assemblies 12 and the feed conveyor 30 in proper synchronization. The drive arrangement and the egg transfer arrangement enables the machine to be operated at a substantially higher rate of speed than possible heretofore with similar machines for this purpose.

Figure 8:
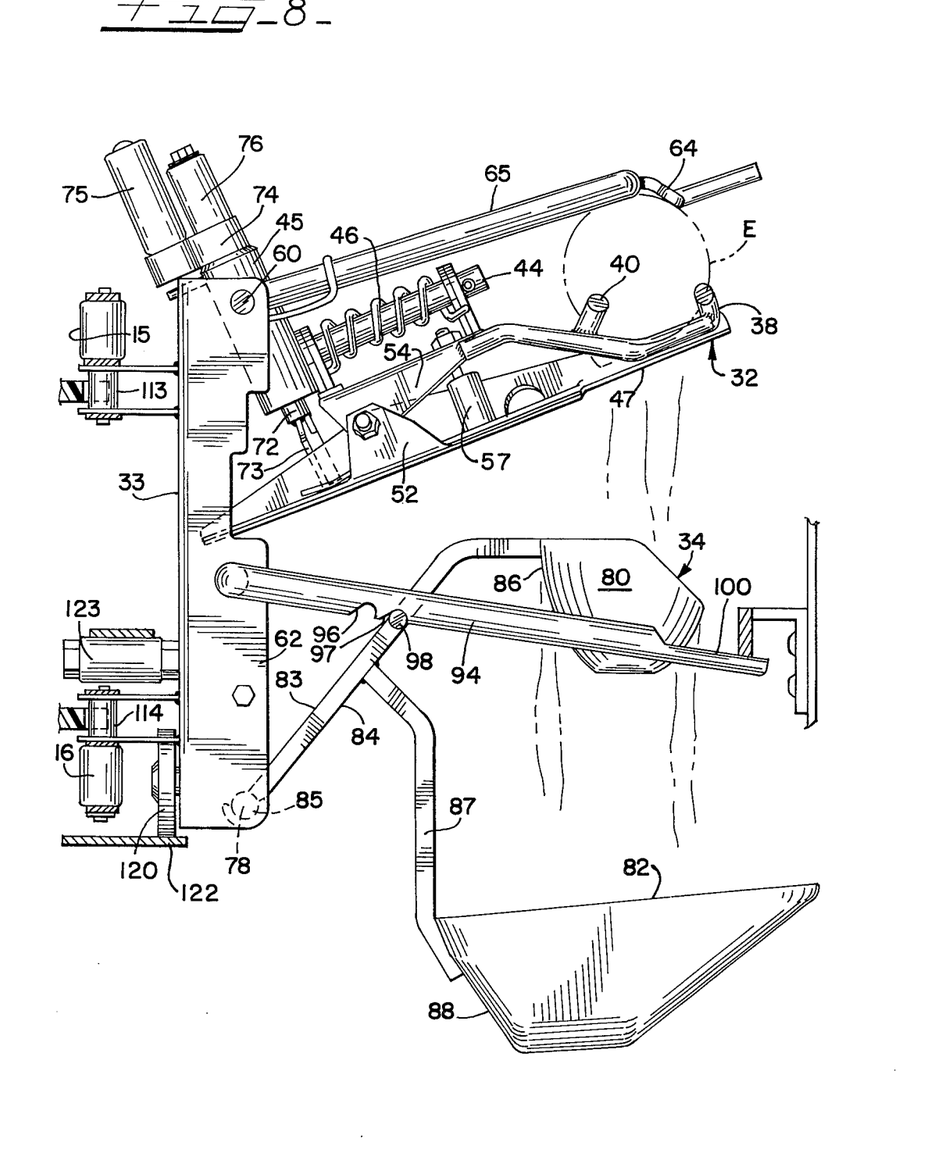
FIG. 8 is a side elevational view of the cracking and separating assembly with the cracking and separating mechanisms in a different position.
Figure 9:
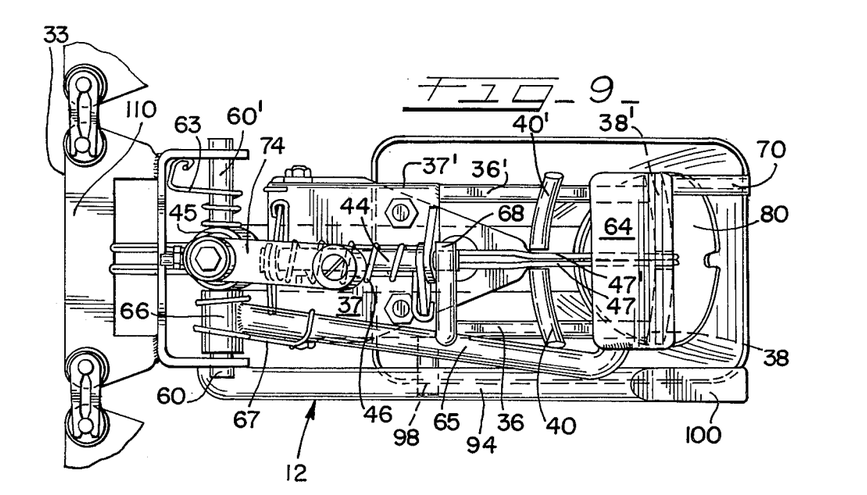
FIG. 9 is a top plan view of the cracking and separating assembly in FIG. 7.
Figure 10:
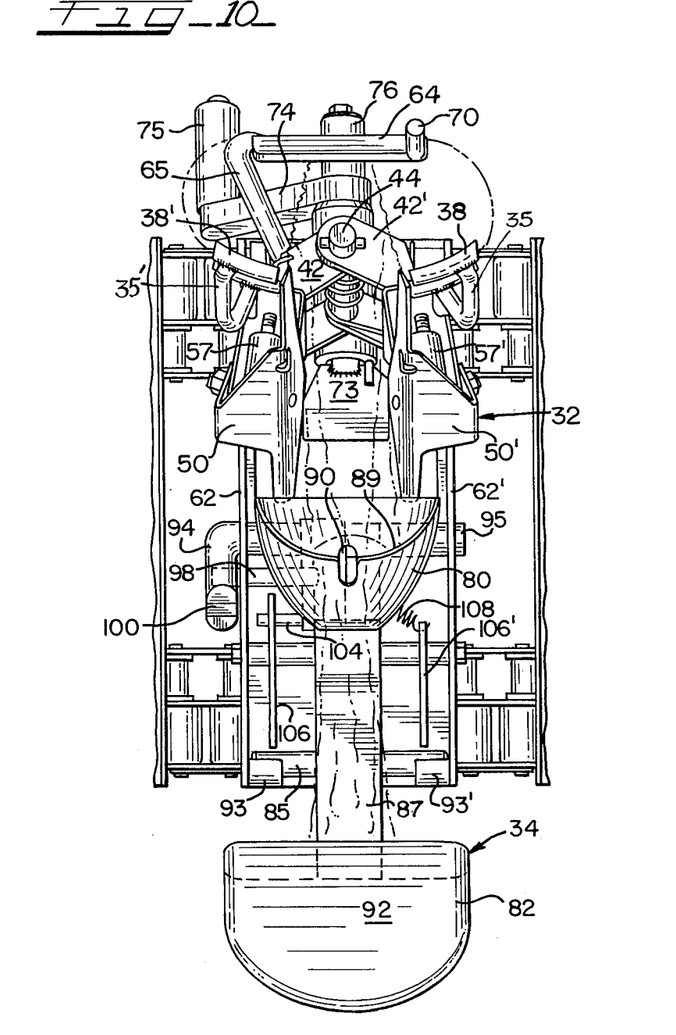
FIG. 10 is a front elevational view of the cracking and separating assembly in FIG. 8.

The operation of the movable elements of the breaking and separating mechanisms 32 and 34 on the assemblies 12 is controlled by track forming cam rods or plates arranged along the path of the conveyor assembly 14. As the breaking and separating assemblies 12 enter the egg feeding or transfer area and advance along the discharge end of the infeed conveyor 30 the cam follower roller 76 (FIG. 7) on each breaking mechanism 32 rides on the track forming outboard edge of the cam member 77 which is contoured to position the cradle forming members 35, 35' at the proper level to receive an egg as it moves out of a pocket of the feeding conveyor 30. The cradle members 35, 35' are held in a partially open position at this point by engagement of the cam follower roller 75 with a cam track forming bar 160 which extends in spaced relation outboard of the cam plate 77. The clamp arm 65 of each mechanism 32 is held in a raised position by engagement of the follower 70 with the cam plate or rod 71. The knife assembly is pivoted to a cocked position which is indicated in phantom line in FIG. 7 by engagement of the inboard end 58, 58' with the cam rod 59. The separating mechanism 34 is at a lowered position with the bottom pan 82 riding on a cam rail 162. As the assembly enters the arcuate portion of the path defined by the sprockets 18, the cam follower 75 leaves cam rail 160 and the torsion spring 46 closes the cradle members while the clamp arm follower 70 leaves the cam rail 71 and the torsion spring 167 lowers the clamp 64 onto the top surface of the egg. The cam rail or plate 162 which controls the level of the tray 82 is contoured to raise the separating mechanism 34 as the assembly travels around the arcuate path. The cam rail 58 terminates allowing the cocked knife blades 47, 47' to snap to cracking position (FIG. 7) as the assembly enters the straight portion of the path beyond the sprocket assembly 18 with the clamp plate 64 held in engagement with the top of the egg by the spring 67 which controls the hold down arm 65. At this point, the cam 77 (FIG. 18) is contoured to lower the assembly 32 to the lowermost position where it is immediately above the yolk cup 80 of the associated separating assembly 34, the latter having been raised by the cam plate 162 to a substantially level position (FIG. 8). At this point, the cam follower 75 engages a forwardly disposed cam plate 164 which swings the cradle members 35, 35' apart to dump the egg contents into the bowl 80 which is aligned beneath the cradle and substantially level. The assembly 34 is immediately raised by the supporting cam rail 162 to engage the pin 98 in the outboard slot 97 of the latch arm 94 while the breaking assembly 32 is raised by the contour of the cam 77 to the uppermost position where it is held by the torsion spring 63. The cam track on the cam plate 164 is contoured to rotate the cam plate 73 to an overcenter position where it locks the cradle members 35, 35' in open position. As the assemblies 32, 34 travel along the greater portion of the straight path portion and around the single sprocket and of the machine, they remain in the draining condition, with the assembly 32 in the uppermost position and the assembly 34 latched in position beneath the same. There is adequate time for the albumen to drain from the shell halves and also to separate from the yolk and drain from the bowl 80 into the collection pan 82. The operator is positioned near the beginning of the straight portion of the conveyor path which extends beyond the single sprocket end of the machine (FIGS. 1 and 3) and is able to detect an inedible egg contents, which is generally one with blood spots, and can be immediately discharged by manipulating the latch arm 94 to release the assembly 34 and allow it to swing down about the pivot 87 so as to discharge both the albumen and the yolk into a receiving vessel which may be in the form of a tray 165 positioned beneath the conveyor path (FIGS. 1 and 3). The operator may also visually observe a broken yolk, which results in mixed albumen and yolk in the collecting tray 82. Upon observing a broken yolk, the operator presses rearwardly on the outboard edge of the collecting tray 82 with sufficient pressure to move the cup 82 rearwardly far enough to move the pin 98 on the bracket 83 from the slot 97 into the rearmost slot 96 in the latch arm 94 and raise the latch arm 94 so that it rides up a cam track forming plate 166 (FIGS. 1 and 3) and unlatches so as to release the separating mechanism for downward swinging movement to discharge the whole egg contents into a receptacle 167. The receptacle 167 may be in the form of a tray located beneath the conveyor path at a point beyond the inedible egg receiving tray 165. The assemblies 12 with properly separated albumen and yolk are allowed to advance to a discharge position where the yolk and the albumen are discharged into separate vessels in the form of vertically spaced top and bottom trays 168 and 170 at the discharge station or area. At the approach to this area, there is an upper cam rail 172 which has a top edge forming a track on which the outermost end 100 of the latch arm 94 is adapted to ride up to a level which releases the assembly 34 so that it swings down to a discharge position with the bowl 80 riding on the lower portion 172' of the cam rail 172, along and above the inboard wall of the yolk receiving vessel 168. The associate albumen collecting pan 82 will be supported in position to discharge into the receiving vessel 170 located beneath the tray 168. The yolk receiving vessel 168 is in the form of a chute or funnel with a bottom outlet having a conduit connection 168' with an associated yolk receiving vessel. A cam rail 173 is positioned at a lower level which has an inwardly bowed configuration to be engaged by an albumen collecting pan 82, when the assembly 34 is released and the pan 82 swings down to a position for discharge of its contents prior to reaching the albumen receiving tray 170, thus insuring that the tray will move around or in back of the vessel 170. The yolk receiving vessel or tray 168 has upwardly sloping sidewalls at the leading sides, and the cam rail member 172 has leading portions which raise the assembly 34 back to the level position and causes the pin 98 to re-engage the latch arm 94. The arrangement interposes an inboard portion of the yolk receiving vessel 168 between the bowl 80 and the albumen pan 82 so that there is no mixing of the discharged material and the size of the receiving vessels 168 and 170 is such that several of the mechanisms 34 may be discharging at the same time. An air jet may be directed toward the yolk bowl 80 at the approach to the discharge area to cut off any trailing albumen and another air jet may be directed into the bowl 80 when it is discharging into the tray 168, the air stream being directed toward the curved rear or inside wall area so as to sweep out any remaining contents.

The assemblies 12 advance from the contents discharge area to a shell discharge area which may be on the arcuate portion of the path of the assemblies 12 as defined by the sprockets 17. The top clamp member 64 is raised by engagement of the cam follower 70 with the beginning of the cam 71 and releases the shell halves for ejection by an air jet 176 into a discharge chute 177. The assemblies 12 advance from the shell ejection or discharge area to the entrance to the egg feeding area and the separating cup assemblies 34 which have been lowered to discharge an inedible egg or a whole egg pass through a washing chamber, as indicated at 178 in FIG. 4, after which they are partially raised on a supporting cam rail 180 as they advance into the feeding area where rows of the eggs are transferred from the conveyor 30 to the breaking mechanisms 32.

To facilitate operation of the machine by the operator and enable the operator to change the speed of the conveyors 14 and 30, a pivotally mounted control handle 182 (FIG. 3) is provided adjacent the operator's position which is connected by a linkage 183 (FIG. 3) and a cross shaft to the valve which controls the hydraulic drive.

Figure 20:
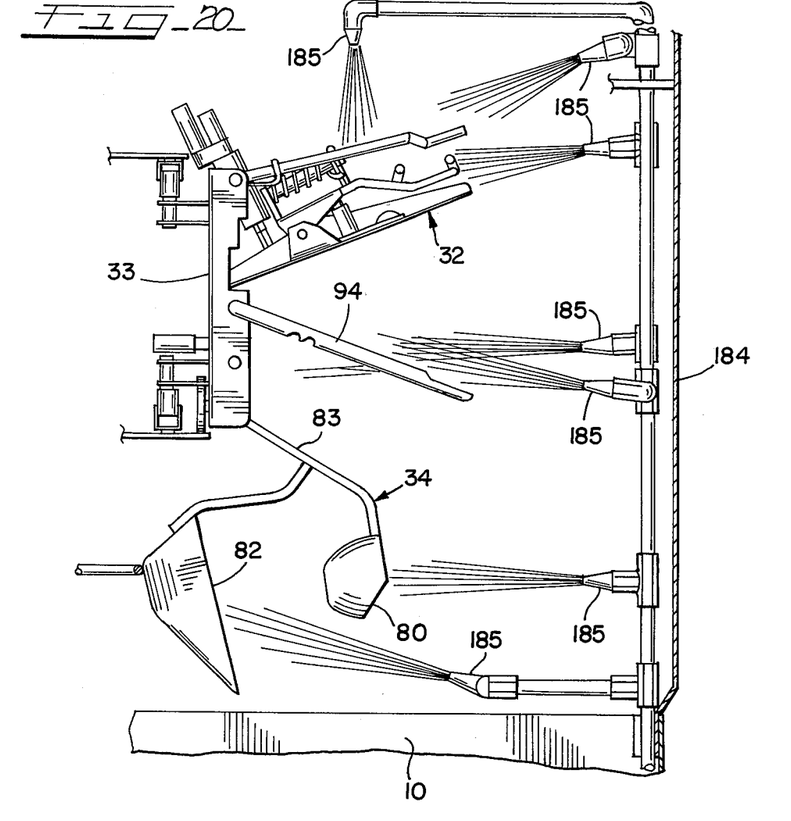
FIG. 20 is a cross-section through the machine showing the clean-up area.

To facilitate rapid clean up when the machine is idled after a period of operation, a washing area or cabinet 184 is provided as shown in FIGS. 1, 2 and 20 which houses a plurality of water jets 185 arranged as shown in FIG. 20 to strike the breaking and separating mechanisms 32 and 34 and associated parts. A pivotally mounted trip cam 186 (FIG. 2) is provided which may be swung to a position to trip the latch arms 94 so as to allow all the separating mechanisms to swing to a lowered position (FIG. 20) where the lower washing jets 185 will strike the cups 80 and pans 82 while the upper jets will strike the cracking mechanism 32.

A fine adjustment of the tuning of the travel of the feeding conveyor 30 and the reciprocation of the pushers 135 relative to the travel of the conveyor 14 is provided, which can be made without stopping the machine. The length of the drive chain 154 (FIG. 1), which connects the main drive shaft 23 with the shaft 153, is such that the innermost and outermost runs of the chain do not traverse straight paths. Thus, the two chain runs can be moved relative to each other to rotate the driven sprocket 153 on the gear box 152 and adjust the timing of the conveyor 30 while the chain is traveling. Two spaced idler sprockets 190 and 191 are movably mounted on the frame plate 192 beneath the chain runs. The sprockets 190, 191 are mounted on elongate slide plates 193 and 194 which move in track formations on the plate 192 in directions transverse of the paths of the chain runs. The sprockets 190 and 191 engage both chain runs on the outboard side so that movement of the sprockets in opposite directions will increase the length of one chain run and decrease the length of the other a corresponding amount resulting in rotation of sprocket 153. The sprocket 190 is urged in an inboard direction by a tension spring 195 which has its inner end secured to the frame of the conveyor 30 and its outer end secured to the outer end of the slide plate 193 so that the sprocket 190 is urged by the spring 195 in the inboard direction, that is, in the direction to lengthen the inboard run of the chain and exert a rotational force on the driven sprocket 153. The movement of the idler sprocket 191 which is mounted on slide plate 194, is controlled by an adjusting screw (not shown) having a crank 196 for manual rotation. By moving the slide plate 194 and sprocket 191 in an inboard direction, the outermost chain run will be lengthened and the innermost run shortened against the force of the spring 195 with resultant rotation of the sprocket 153 in a direction opposite that resulting from inboard movement of the sprocket 190. With this arrangement, the length of the two chain runs may be altered and the driven sprocket 153 may be rotated in small increments to adjust the timing of the two conveyors while they are running in addition to maintaining tension in the chain 154.

What is claimed is:

1. An egg breaking and contents separating machine comprising a series of egg breaking and contents separating mechanisms mounted on vertically disposed bracket forming supporting members which are connected together in side by side relation so as to form an endless traveling conveyor assembly which is mounted on rotatable conveyor support members secured on vertically disposed, spaced shafts on a supporting frame, each said bracket member having mounted at its upper end an egg receiving, clamping and breaking mechanism and having mounted at its lower end an egg contents separating mechanism, both said mechanisms being mounted for swinging movement outboard of said bracket member, said egg receiving, clamping and breaking mechanism including a pair of egg supporting cradle members disposed at the outer ends of elongate plate support members which extend outboard of said bracket member and which have pairs of spaced, upstanding, link forming members arranged in cooperating paired relation, with each said pair of link members pivoted on a common support pin projecting outwardly of the bracket member, spring means urging the cradle members toward a closed side by side position, pivotally mounted spring urged shell cracking knife blades pivotally mounted for movement along opposed edges of the cradle members, a single clamping bar member mounted on the outboard end of a pivoted support arm so as to extend above said cradle members, spring means urging said clamping bar toward a position to engage the top surface of the shell of an egg positioned on the cradle members with the long axis in a plane generally normal to the plane of the cracking knife blades, and cam means for moving said cradle members between open and closed positions, which cam means is in the form of a small cam plate disposed between the opposed inner edges of the cradle support members and which is mounted for rotation on a vertical axis, said cam plate being of a size and configuration to swing the cradle members apart upon predetermined rotation about said vertical axis and to releasably lock the cradle members when said cradle members are in a fully open position.

2. An egg breaking and contents separating machine as set forth in claim 1 wherein said small cam plate is mounted at the bottom end of a vertical shaft which is rotatable in a vertically disposed cylinder, which cylinder is pivotally mounted on said bracket support member and adapted to pivot on an axis which provides limited outboard swinging movement of said breaking mechanism, spring means urging the breaking mechanism in an upward direction, a radial arm member secured on the upper end of said vertical shaft and having a cam follower on its free end for engaging a cam track formation so as to control the rotation of said cam plate and thereby the opening and closing of said cradle members.

3. An egg breaking and contents separating machine as set out in claim 2 and said vertical shaft having at its uppermost end a cam follower positioned to engage a cam track formation for tilting said vertically disposed cylinder so as to move said cradle members to a lowered position for receiving an egg and thereafter to a dumping position closely adjacent the separating mechanism.

4. An egg breaking and contents separating machine as set forth in claim 1 wherein said separating mechanism comprises an albumen collecting pan and a yolk receiving and separating cup mounted on a connecting bracket in fixed position above the collecting pan, said collecting pan having at its inboard side a pivot pin, said bracket support member having bearing socket formations at its lower end in which said pivot pin on said collecting pan is adapted to be removably seated, a latch forming arm pivotally mounted on said bracket support member above said bearing socket formations and extending outboard of said bracket support member, said latch arm having means associated with its pivotal mounting for limiting its downward swinging movement and for locking said pivot pin on said collecting pan in said bearing socket formations, said latch arm and said connecting bracket for said cup and pan having interengaging means for supporting said cup and pan in two different positions immediately below said breaking mechanism.

5. An egg breaking and contents separating machine as set out in claim 1 further including quick release mounting means connecting each said vertically disposed bracket forming supporting members, upon which said egg breaking and contents separating mechanism are mounted, to an endless traveling conveyor member for enabling each said egg breaking and contents separating mechanism to be rapidly removed from said endless traveling conveyor assembly.

* * * * *

UNITED STATES PATENT AND TRADEMARK OFFICE
CERTIFICATE OF CORRECTION

PATENT NO. : 4,321,864
DATED : March 30, 1982
INVENTOR(S) : Charles H. Willsey

It is certified that error appears in the above-identified patent and that said Letters Patent are hereby corrected as shown below:

Column 1, line 11, delete "egss" and insert -- eggs --

Column 1, line 40, delete "high" and insert -- highly --

Column 5, line 58, delete "dring" and insert -- during --

Column 7, line 2, insert "and" before "through"

Column 9, line 68 delete "167" and insert -- 67 --

Column 10, line 29, delete "and" and insert -- end --

Column 10, line 42, delete "87" and insert -- 78 --.

Signed and Sealed this

Fourteenth Day of September 1982

[SEAL]

Attest:

GERALD J. MOSSINGHOFF

Attesting Officer    Commissioner of Patents and Trademarks